(No Model.)
E. G. ACHESON.
CALELECTRIC GENERATOR.
No. 375,408. Patented Dec. 27, 1887.
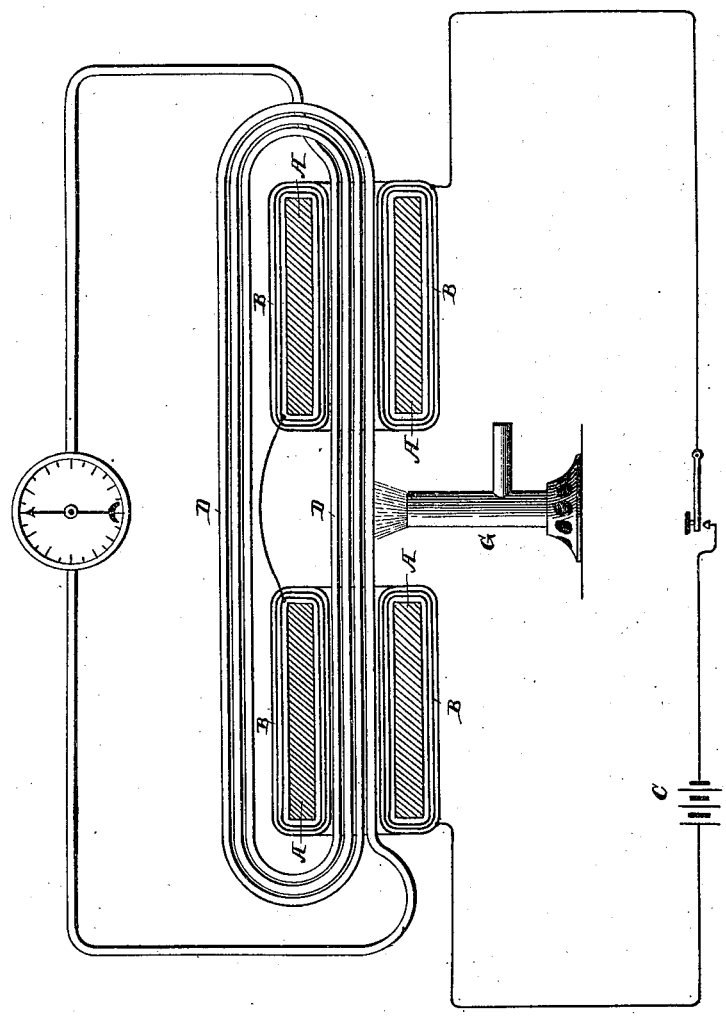
Attest:
Jno. G. Hinkel Jr.
S. L. Johnson
Inventor:
E. G. Acheson by
Foster & Freeman
attys

UNITED STATES PATENT OFFICE.

EDWARD G. ACHESON, OF PITTSBURG, PENNSYLVANIA.

CALELECTRIC GENERATOR.

SPECIFICATION forming part of Letters Patent No. 375,408, dated December 27, 1887.

Application filed August 26, 1887. Serial No. 247,919. (No model.)

*To all whom it may concern:*

Be it known that I, EDWARD G. ACHESON, a citizen of the United States, residing at Pittsburg, Allegheny county, Pennsylvania, have invented certain new and useful Improvements in Calelectric Generators, of which the following is a specification.

My invention has for its object the generation of electricity from heat, or the conversion of heat directly into electricity; and my invention consists in the new method of and apparatus for carrying out this object, substantially as hereinafter set forth.

Heretofore many attempts have been made to produce electricity by the direct conversion of heat, and in what are known as "thermoelectric piles," &c.; but my invention differs from all these, both in principle and construction; and in order to embody my invention in practical form I have constructed a mechanism the essentials of which I am about to set forth, and which I have designated a "calelectric generator."

The accompanying drawing shows so much of such an embodiment of my invention as is necessary to a clear understanding of the principles and operation thereof.

My invention is based, primarily, upon the discovery that if what is known to those skilled in the art as the "magnetic whirl" is produced in or about an electric conductor which is traversed by currents of heat an electric current will be generated in said conductor at each establishment and disestablishment of such magnetic whirl cutting said conductor. I have also discovered that such electric currents may be produced in such a conductor in a manner so that they may be utilized as power for all purposes for which electricity is applicable. In my experiments leading up to and in demonstrating and applying this discovery I have used various means for producing these electric whirls in or about a conductor through which currents of heat were caused to pass, and without attempting to describe all the various ways in which this can be done I will refer to the accompanying drawing in describing one simple way which embodies the principle of my discovery; and it is understood that my invention is in no way limited to the construction and arrangement of parts as therein shown, as many other arrangements will be apparent to those skilled in the art.

As a simple means for producing the magnetic whirls, I use a cylindrical core, A, of some magnetic material, and wind the same with a series of convolutions, B, of insulated wire, the terminals of which are connected to some suitable generator, C, of electricity supplying an alternating, intermittent, or vibratory current. Through this coil is passed the conductor or conductors D, forming the generating or converting coil, the terminals of which are connected to a working-circuit, and means are provided for causing heat-currents to traverse said conductor—as, for instance, a gas-burner, G. If, now, the electric current is closed through the convolutions B, a magnetic whirl is produced cutting the conductor D; and if at the same time heat-currents are caused to flow through the portions of said conductor within the influence of said whirls an electric current will be generated in said conductor at each establishment and disestablishment of the whirls, and a conversion of the heat currents or energy into electric currents or energy takes place in said conductor. I prefer to provide two magnetic whirls around the conductor with the direction of the lines of force in opposition; and by locating the source of heat between said whirls, so that the heat will flow from a central point in opposite directions, as shown in the drawing, the direction of the lines of force of the whirls with relation to the direction of the heat-currents will be such as to produce or convert the said heat-currents into electric currents of the same direction.

It will be understood that the cores A are not necessary, as the convolutions themselves will produce the whirl, and the electro-motive force of the converted current will depend upon the intensity of the magnetic whirls, the length of generating or converting conductor exposed to said whirls, and the volume and velocity of the heat-currents.

From the above the nature of my invention and the principles upon which it is based will be understood by those skilled in the art, and without limiting myself to what has been specifically described, I claim—

1. The method, substantially as herein set forth, of converting heat energy into electrical energy, which consists in causing heat-currents to traverse an electric conductor and producing a magnetic whirl cutting said heat-currents.

2. The method, substantially as herein set forth, of converting heat energy into electrical energy, which consists in causing heat-currents to traverse an electric conductor and establishing and disestablishing magnetic whirls cutting said heat-currents.

3. The combination, with an electric conductor and a heat-generator for producing heat-currents therein, of another electric conductor through which varying electric currents are passed, arranged in relation to each other so that the heat-conductor shall be within the influence of the magnetic whirl of the electric conductor, substantially as described.

4. The combination, with an electric conductor and a heat-generator for producing heat-currents therein, of an electric conductor through which varying electric currents are passed, arranged to produce magnetic whirls cutting the heat-conductor, one on each side of the heat-generator, substantially as described.

5. The combination, with an electric conductor and a heat-generator for producing heat-currents therein, of a core surrounding said conductor on each side of the heat-generator, and an electric conductor through which varying electric currents are passed, forming convolutions around each of said cores, substantially as described.

In testimony whereof I have signed my name to this specification in the presence of two subscribing witnesses.

EDWARD G. ACHESON.

Witnesses:
F. L. FREEMAN,
W. C. DUVALL.